July 8, 1958 E. C. DENCH ET AL 2,842,667

PARALLEL OPERATIONS OF TRAVELING WAVE OSCILLATORS

Filed Jan. 19, 1954

INVENTORS
EDWARD C. DENCH
ROY A. PAANANEN
BY Elmer J. Gorn
ATTORNEY

United States Patent Office 2,842,667

Patented July 8, 1958

2,842,667

PARALLEL OPERATIONS OF TRAVELING WAVE OSCILLATORS

Edward C. Dench and Roy A. Paananen, Needham, Mass., assignors to Raytheon Manufacturing Company, Waltham, Mass., a corporation of Delaware Application January 19, 1954, Serial No. 404,944

13 Claims. (Cl. 250—36)

This invention relates to the parallel operation of two or more traveling wave oscillators or of one or more traveling wave oscillators and a source of relatively stable frequency.

Traveling wave oscillators capable of operation at relatively high power levels are comparatively difficult and expensive to design and manufacture. In many applications, for which traveling wave oscillators are desirable, a single one of such devices is inadequate to supply the necessary power demands. It is often desirable, therefore, to interconnect in parallel a plurality of traveling wave oscillators whose nominal free-running operating frequencies are relatively close together. This may be achieved by utilizing one traveling wave oscillator tube as a so-called master tube which is so constructed that its frequency of oscillation is substantially independent of load conditions, including the loading effect of the other oscillator tubes. The remaining tube or tubes, hereinafter referred to as slave oscillator tubes, are made load-sensitive so as to lock in satisfactorily to the frequency of the master tube.

For a detailed description of traveling wave oscillators, either with or without a transverse magnetic field, reference may be had to a copending application of Edward C. Dench for United States Letters Patent, Serial No. 382,025, filed September 24, 1953.

Traveling wave oscillators, such as contemplated in the subject invention, include a positive feed back loop consisting of a periodic transmission delay line or structure and an electron beam injected from an electron gun near one end of said delay line through an interaction space adjacent said delay line. A collector electrode may be provided at the end of the delay line for collecting any electrons not captured by the delay line, although, in some cases, the electrons are permitted to impinge upon the periodic delay line itself and the collector electrode may be dispensed with. At the end of the periodic delay line remote from the electron gun is positioned a terminating attenuating section such as described in detail in the aforesaid copending application. An R. F. output system at the electron gun end of the periodic delay line serves to couple high frequency energy from the delay line to an external load. The attenuating region is necessary to prevent moding effects resulting from impedance mismatches between the oscillator tube and the load. This attenuation serves to absorb any energy reflected from the mismatched load so that reflection of energy back toward the load is substantially reduced. A method of introducing attenuation is suggested in the aforesaid copending application.

One method of introducing reflection of varying amounts in the traveling wave oscillator is to provide a discontinuity in the periodic delay line, as by bending one or more of the interdigital fingers, loops, or vanes, as the case may be, of the periodic structure. This method is particularly satisfactory since it is possible to readily alter a plurality of traveling wave tubes of identical construction.

If the attenuation is progressively tapered, the amount of reflection therefrom is relatively small, whereas if the attenuation is abruptly introduced into the periodic delay line, the reflection of energy may be quite large. By varying the degree of regularity of the attenuating region, the reflection coefficient may take any one of several different values. It is also possible to vary the length of the attenuating region or the amount of the attenuation introduced so that reflections from the far end of the tube are absorbed by varying amounts before reaching the portion of the tube where energy interaction occurs.

The distinction between the master oscillator tube and the slave tube or tubes depends upon the relative effect of external disturbances from the output on the feedback loop. For the master oscillator tube, the reflection from the attenuation end of the delay line is preferably maintained at a relatively low value. The reflection coefficient $\rho$ for the master oscillator may be as close to zero as practically obtainable and values of the order of .01 or less may be used. For the slave oscillator tube or tubes, the reflection from the collector end of the delay line is made greater than that of the master tube. For example, $\rho$ may be between .05 and .20 for the slave oscillator tubes. If the reflection coefficient $\rho$ of the master oscillator tube is made quite small, any energy entering said master tube, whether from other traveling wave oscillator tubes or from discontinuities in the load, etc., will travel along the master oscillator tube in the direction of travel of the electron beam. Consequently, practically none of the incident energy arriving at the attenuation end of the master tube will interact with the electron beam of this tube and substantially all of the energy will be dissipated in the attenuating region of the master tube. On the other hand, any energy entering the slave oscillator tube or tubes, with their larger reflection coefficients, will be partially reflected from the attenuation end of the slave tube or tubes, and this reflected energy will obviously be in a direction to interact with the coresponding electron beam and, hence, will exert a controlling effect upon the operating frequency of the corresponding slave tube.

This invention, however, is not necessarily limited to a master tube having a very small reflection coefficient or to master and slave traveling wave tubes having widely different reflection coefficients. So long as one oscillator tube possesses a reflection coefficient less than that of the remaining shunt connected tubes, said one tube will act as the master oscillator and will control the frequency of the remaining tubes in parallel therewith.

The energy reflected from the end of the periodic delay line of the slave tube is equivalent to an injection at that point of a locking signal from an auxiliary input power supply. If a locking signal were actually injected in this manner, however, the auxiliary input supply would have to furnish sufficient power to overcome the attenuation in the traveling wave tube and an input supply whose power rating is of the same order of magnitude as that of the traveling wave tube would be required. Such an arrangement would obviously be impractical.

The R. F. electric field distribution along the traveling wave oscillator tube is a maximum near the output end and a minimum in the attenuation region of the tube. Since the reflection occurs at a point along the tube at which the R. F. field is relatively weak, only a comparatively small amount of synchronizing energy from the master oscillator tube will be required to hold several slave tubes in step.

This invention further contemplates the parallel interconnection of the outputs of one or more traveling wave oscillators and the output of a fixed frequency master generator, such as a frequency controlled klystron, or the frequency multiplied output of some fixed low frequency oscillator, such as a crystal oscillator, for maintaining the operating frequency of said traveling wave oscillator or oscillators substantially constant. With this arrangement, the frequency of the traveling wave oscillator or oscillators can be locked at some accurate predetermined value depending upon the frequency of the master oscillator.

An extension of the arrangement just described lends itself to the locking of parallel connected traveling wave oscillators on any one of several accurate operating frequencies, and involves the parallel connection of the outputs of a plurality of traveling wave oscillators to the output of a selected one of several fixed frequency oscillators. The particular desired frequency of operation of the traveling wave oscillator is first determined by a choice of the particular fixed frequency master oscillator used. In order for the traveling wave oscillator to lock on this desired frequency, however, it is necessary that the free-running frequency of each traveling wave oscillator be reasonably close to that of the fixed frequency master oscillator. This adjustment of the free-running frequency may be accomplished for each individual tube by the usual method of anode voltage tuning, thus varying the electron beam velocity.

Figures 1, 2, 3:
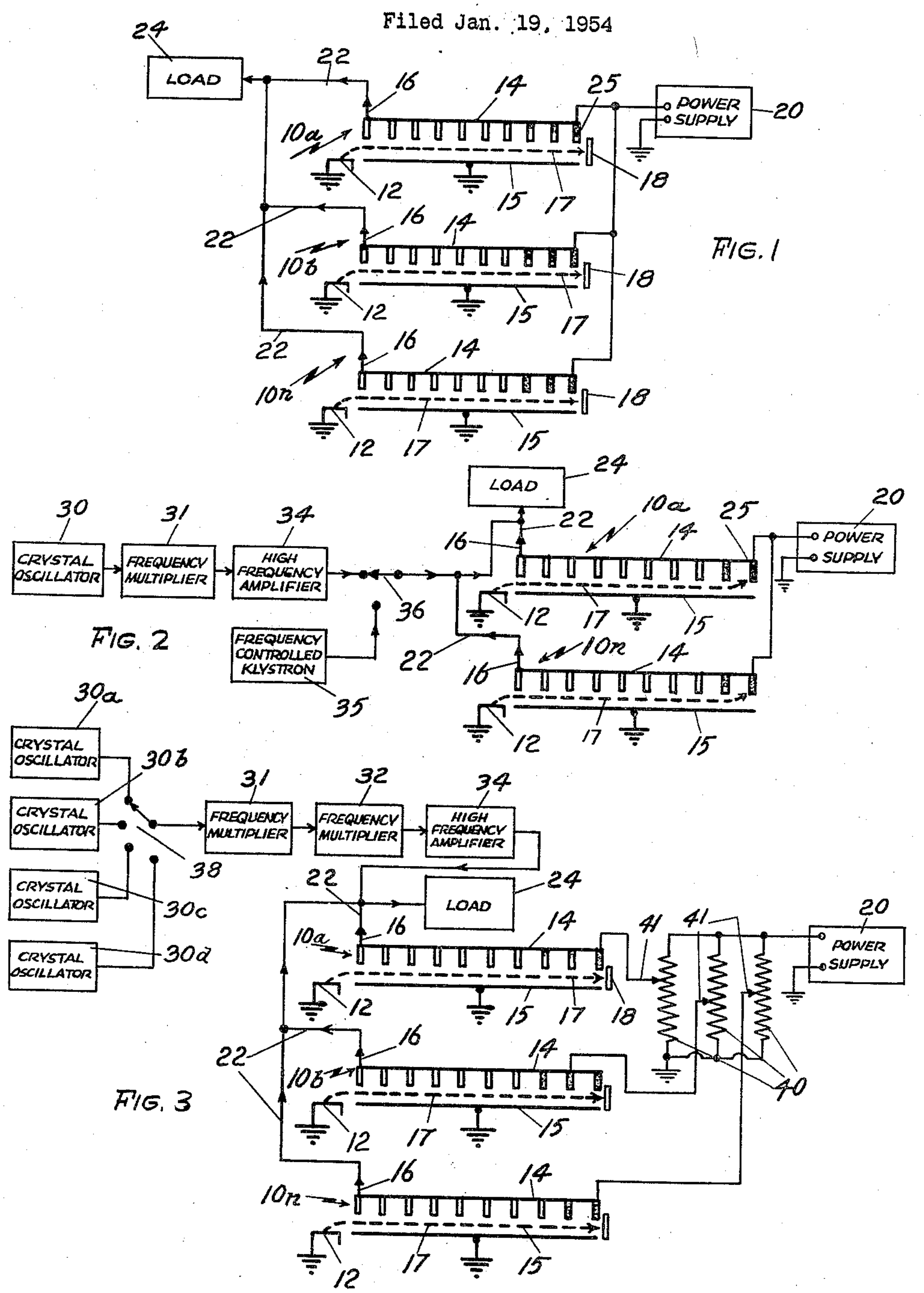
Fig. 1 is a diagram showing a first parallel arrangement of traveling wave tubes according to the invention.
Fig. 2 is a diagram of a second parallel arrangement of traveling wave tubes according to the invention.
Fig. 3 is a diagram illustrating a third parallel arrangement of traveling wave tubes in accordance with the invention.

Referring now to Fig. 1, a parallel arrangement of several traveling wave oscillator tubes **10*a*, 10*b* . . . 10*n* are illustrated. The number of such tubes depends, of course, upon the power requirements of the load, as well as upon the power capabilities of the individual tubes. Each tube includes a source of electrons 12, a periodic anode transmission delay structure 14, a continuous electrode 15 substantially parallel to said periodic delay structure and output coupling means 16, indicated by a heavy arrow. An electric field is maintained between the periodic delay structure 14 and the continuous electrode 15 of each tube by means of a source of potential derived from the power supply 20**.

This invention is applicable to any type of traveling wave oscillator. Tubes **10*a*, 10*b* . . . 10*n* of Fig. 1, as well as those of Figs. 2 and 3, are shown in schematic form only, and such tubes are subject to many structural variations in practice. For example, electron emitting electrode 12 may be a continuous cathode coextensive with the periodic delay structure in lieu of the separate cathode 12 and continuous cold electrode 15, shown schematically in Figs. 1–3. A periodic anode delay structure 14, although schematically indicated as a series of spaced vanes, may be of the interdigital or loaded wave guide type, such as shown in the aforesaid copending application, or any other suitable periodic delay structure, such as a helix or strapped loop network. Although the cathode 12 and continuous electrode 15** are shown grounded in the drawing, these electrodes may be maintained at other than ground potential and need not even be at the same potential. This invention is equally applicable to tubes with or without a magnetic field transverse to the aforesaid electric field. Finally, the tubes may be circular as well as linear.

The electrons from cathode 12 are directed in a beam 17 along a path adjacent the periodic structure 14 so as to permit interaction between the beam and the R. F. field associated with said periodic structure.

The tubes may contain an electron collecting electrode 18 at the end of the tube opposite the cathode for intercepting the electrons traversing the interaction space. Alternatively, the collecting electrode may be omitted and the electrons allowed to impinge upon the attenuating region of the periodic delay structure, as shown in Fig. 2.

The outputs from each of the tubes 10 are interconnected by appropriate transmission lines 22 and the combined output is applied to a useful energy absorptive load 24 whose impedance, for proper matching, is given by $$\frac{Z_O}{n}$$

where $Z_O$ is the impedance of each oscillator tube output coupling and $n$ is the total number of paralleled oscillators. One of the group of traveling wave oscillator tubes, such as tube **10*a* of Fig. 1, is adapted to serve as the master oscillator. This tube is so designed that the reflection from the attenuation end of the delay line is held to a low value, as compared with the reflection from the remaining slave oscillator tube or tubes. Each of the remaining tubes, that is 10*b* . . . 10*n*, are slave tubes and the corresponding periodic delay structures are characterized by greater reflection coefficients adjacent the attenuation end than that of the master oscillator tube. The attenuation region, previously referred to, may be provided by a thin coating 25 of lossy material, such as graphite or iron applied by any one of several standard techniques to the elements of the periodic structure 14** adjacent the end thereof, or by variations in the geometry of the periodic structure, as described in the aforesaid application. As previously stated, the desired reflection may be introduced by a deliberate deformation of certain elements of the periodic structure adjacent the end remote from the electron gun.

The resultant effect of the reflection of energy from the slave tubes is that the latter are locked at some frequency determined by the instantaneous characteristics of the master oscillator tube. It is essential, of course, that the free-running frequency of each of the slave tubes lies somewhere in the vicinity of the frequency of the master oscillator tube or tubes in order to insure effective locking.

In Fig. 2, an arrangement is shown, for locking the frequency of one or more traveling wave oscillators by means of a conventional fixed low frequency oscillator 30, shown by way of example, as a crystal oscillator. Although two traveling wave tubes are shown in Fig. 2, any number of such tubes may be connected in parallel in the manner already shown in Fig. 1. In order to obtain a high frequency suitable for locking a traveling wave oscillator, which usually operates in the microwave region, the output of the crystal oscillator 30 is applied to a series of frequency multiplier stages 31 whose number depends upon the relation between the crystal oscillator frequency and the desired operating frequency of the traveling wave oscillator or oscillators and on the frequency multiplication obtainable in each multiplier stage. The multiplied output from multiplier stages 31 is amplified by the high frequency amplifier 34 which may, for example, be either a klystron or a so-called lighthouse triode amplifier, both of which are well known in the art. The output of amplifier 34 may be interconnected by way of selector switch 36 with the output of the various traveling wave oscillators **10*a* . . . 10*n* and all of the outputs are applied in shunt to a useful load 24, as in the case of Fig. 1. Alternatively, the master oscillator may be a frequency controlled klystron 35 which is connected in parallel with the traveling wave tube through the aforesaid selector switch 36. The system of Fig. 2 has some advantages over that of Fig. 1 in that crystal controlled low frequency oscillators and low power klystrons are relatively inexpensive and the voltage stability of the system is not critical. Furthermore, the frequency of the slave tubes 10*a* . . . 10*n* of Fig. 2 may be maintained at some predetermined value regardless of fluctuations in the parameters of the individual traveling wave oscillators. As in the system described in Fig. 1, the free-running frequency of the traveling wave tubes of Fig. 2 must be in the vicinity of the frequency of the energy derived from high frequency amplifier 34 or klystron 35, as the case may be, in order to insure effective locking. It may be necessary, therefore, to vary the potential of source 20** in order to bring the frequency of the traveling wave oscillators within the locking range of the fixed frequency master oscillator.

In certain applications, it is desirable to supply a comparatively large amount of microwave power to a load at more than one fixed frequency. In Fig. 3, an arrangement is shown for alternatively operating a plurality of traveling wave oscillators in parallel at any one of several accurately predetermined frequencies. This arrangement comprises a shunt array of traveling wave tubes, such as are already described in Figs. 1 and 2, connected to a load in parallel with the fixed frequency output of high frequency amplifier 34. A frequency controlled klystron or other fixed frequency oscillator may be used instead of the crystal oscillator 30 and multiplier chain 31, 32. The fixed frequency oscillators 30*a*, 30*b* . . . 30*n* are selectively connected to frequency multiplier stages 31 and 32 by means of a selector switch 38. These multipliers are tunable to take into account the fact that different input frequencies are available and, hence, provide an output from the final multiplier stage whose frequency is the same integral multiple of the frequency of the selected crystal oscillator, regardless of the particular crystal oscillator used.

In order to compensate for inherently different characteristics of the various traveling wave tubes, the potential applied thereto from unidirectional source 20 may be adjusted by means of a group of potentiometers 40 connected across source 20 and each having a movable arm 41 connected to the periodic structure 14 of a corresponding one of said traveling wave tubes. By a proper adjustment of each potentiometer arm, the corresponding oscillator tubes may be voltage-tuned so as to operate within the locking range for each tube. Thus, the traveling wave tube may be made to lock on any one of the accurate frequencies depending upon the position of selector switch 38. Since the oscillator tubes 10 of Fig. 3 are slave tubes, they are preferably characterized by a relatively high reflection coefficient.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In combination, a master source of electrical energy, at least one self-excited traveling wave oscillating device including a periodic energy transmission delay structure for transmitting electromagnetic wave energy, a source of electrons, means for directing a beam of said electrons in energy interacting relationship with said wave energy, and an output coupling means coupled to one end of said periodic structure, means for coupling energy generated by said master source into said delay structure of said traveling wave oscillating device in frequency controlling interaction with said corresponding electron beam, and means for connecting said master source and said device to a common load.

2. In combination, a master source of electrical energy, a plurality of self-excited traveling wave oscillating devices each including a periodic energy transmission delay structure for transmitting electromagnetic wave energy, a source of electrons, and means for directing a beam of said electrons in energy interacting relationship with said wave energy, means for coupling energy generated by said master source into said delay structure of each of said traveling wave oscillating devices in frequency controlling interaction with said corresponding electron beam, and means for connecting said devices to a common load.

3. The combination set forth in claim 2 in which said master source includes a fixed low frequency oscillator and frequency changing means responsive thereto for deriving an output voltage whose frequency is identical to the desired oscillation frequency of said traveling wave oscillating devices.

4. The combination set forth in claim 2 in which said master source comprises a frequency stabilized oscillator whose frequency is identical to the desired oscillation frequency of said traveling wave oscillating devices.

5. In combination, a plurality of traveling wave oscillating devices each including a periodic energy transmission delay structure for transmitting electromagnetic wave energy, a source of electrons, and means for directing a beam of said electrons in energy interacting relationship with said wave energy, said structures each having adjacent one end thereof an electrical attenuating region from which energy incident thereon is reflected, one of said devices having a coefficient of reflection from said one end less than that of the other ones of said devices, and means for coupling energy generated by said one device into each of said other devices in frequency controlling interaction with said corresponding electron beam.

6. In combination, a plurality of traveling wave oscillating devices each including a periodic energy transmission delay structure for transmitting electromagnetic wave energy, a source of electrons, and means for directing a beam of said electrons in energy interacting relationship with said wave energy, said structures each having an electrical attenuating region adjacent one end thereof from which energy incident thereon is reflected, one of said devices having a coefficient of reflection from said one end less than that of the other ones of said devices, means for coupling energy generated by said one device into each of said other devices in frequency controlling interaction with said corresponding electron beam, and means for connecting said devices to a common load.

7. In combination, a plurality of traveling wave generating devices each including a periodic energy transmission delay structure for transmitting electromagnetic wave energy, a source of electrons, means for projecting a beam of said electrons in energy interacting relationship with said wave energy, and an output deriving means connected adjacent one end of said periodic structure, said periodic structure having an electrical attenuating region adjacent the other end thereof for permitting reflection of energy therefrom in a direction opposite to the direction of travel of said electron beam, one of said devices having a coefficient of reflection from said other end less than that of the others of said devices, and means for coupling energy from said one device into said others of said devices in frequency controlling interaction with said corresponding electron beam.

8. In combination, a plurality of traveling wave generating devices each including a periodic energy transmission delay structure for transmitting electromagnetic wave energy, a source of electrons, means for projecting a beam of said electrons in energy interacting relationship with said wave energy, and an output deriving means connected adjacent one end of said periodic structure, said periodic structure having an electrical attenuating region adjacent the other end thereof for permitting reflection of energy therefrom in a direction opposite to the direction of travel of said electron beam, one of said devices having a coefficient of reflection from said other end less than that of the others of said devices, means for coupling energy from said one device into said others of said devices in frequency controlling interaction with said corresponding electron beam, and means for connecting said output deriving means to a common load.

9. In combination, a source of energy of substantially fixed frequency, at least one traveling wave generating device including a periodic energy transmission delay structure for transmitting electromagnetic wave energy, a source of electrons adjacent one end of said structure, means for projecting a beam of said electrons in energy interacting relationship with said wave energy, and an output deriving means connected adjacent said one end of said periodic structure, the frequency of said source of energy being substantially identical to the desired frequency of operation of said device, and means for coupling energy from said source of energy to said one end of said device, said delay structure including means adjacent the other end thereof for permitting reflection of energy therefrom in frequency controlling interaction with said electron beam.

10. In combination, at least one source of energy of substantially fixed frequency, a plurality of traveling wave generating devices each including a periodic energy transmission delay structure for transmitting electromagnetic wave energy, a source of electrons, means for projecting a beam of said electrons in energy interacting relationship with said wave energy, and an output deriving means connected adjacent one end of said periodic structure, said periodic structure having an attenuating region adjacent the other end thereof for permitting reflection of energy therefrom in a direction opposite to the direction of travel of said electron beam, the frequency of said source of energy being substantially identical to the desired frequency of operation of said devices, means for coupling energy from said source of energy to said devices in frequency controlling interaction with said electron beam, and means for connecting said output deriving means and said source of energy to a common load.

11. In combination, a source of fixed frequency oscillatory energy, a plurality of traveling wave generating devices each including a periodic energy transmission delay structure for transmitting electromagnetic wave energy, a source of electrons, means for projecting a beam of said electrons in energy interacting relationship with said wave energy, and an output deriving means connected adjacent one end of said periodic structure, said periodic structure having an electrical attenuating region adjacent the other end thereof for permitting reflection of energy therefrom in a direction opposite to the direction of travel of said electron beam, frequency changing means responsive to said oscillatory energy for deriving high frequency energy whose frequency is substantially identical to the desired frequency of operation of said devices, means for coupling energy from said frequency changing means to said devices in frequency controlling interaction with said corresponding electron beam, and means for connecting said output deriving means and the output from said frequency changing means in parallel to a common load.

12. In combination, a master source of electrical energy, a plurality of traveling wave generating devices each including a periodic energy transmission delay structure for transmitting electromagnetic wave energy, a source of electrons, means for projecting a beam of said electrons in energy interacting relationship with said wave energy, and an output deriving means connected adjacent one end of said periodic structure, and means for permitting energy from said master source of energy to said devices in frequency controlling interaction with said corresponding electron beam.

13. In combination, a master source of electrical energy, a plurality of traveling wave generating devices each including a periodic energy transmission delay structure for transmitting electromagnetic wave energy, a source of electrons, means for projecting a beam of said electrons in energy interacting relationship with said wave energy, and an output deriving means connected adjacent one end of said periodic structure, means for permitting energy from said master source of energy to traverse said transmission delay structure in a direction opposite to the direction of travel of said electron beam in frequency controlling interaction with said corresponding electron beam, and means for connecting all of said output deriving means in parallel to a common load.

References Cited in the file of this patent

UNITED STATES PATENTS

| | | |
|---|---|---|
| 2,444,928 | Harrison | July 13, 1948 |
| 2,452,601 | Ranger | Nov. 2, 1948 |
| 2,521,760 | Starr | Sept. 12, 1950 |
| 2,541,843 | Tiley | Feb. 13, 1951 |
| 2,653,270 | Kompfner | Sept. 22, 1953 |
| 2,657,305 | Knol et al. | Oct. 27, 1953 |
| 2,658,148 | Evans et al. | Nov. 3, 1953 |
| 2,726,332 | Arditi et al. | Dec. 6, 1955 |
| 2,751,518 | Pierce | June 19, 1956 |

OTHER REFERENCES

Kompfner and Williams: "Backward-Wave Tubes," Proc. I. R. E., vol. 41, pp. 1602–1611, November 1953.